US008265290B2

(12) United States Patent
Nakajima et al.

(10) Patent No.: US 8,265,290 B2
(45) Date of Patent: Sep. 11, 2012

(54) DEREVERBERATION SYSTEM AND DEREVERBERATION METHOD

(75) Inventors: Hirofumi Nakajima, Wako (JP); Kazuhiro Nakadai, Wako (JP); Yuji Hasegawa, Wako (JP); Hiroshi Tsujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 512 days.

(21) Appl. No.: 12/548,871

(22) Filed: Aug. 27, 2009

(65) Prior Publication Data

US 2010/0054489 A1 Mar. 4, 2010

Related U.S. Application Data

(60) Provisional application No. 61/092,532, filed on Aug. 28, 2008.

(30) Foreign Application Priority Data

Jul. 27, 2009 (JP) ................................ 2009-174586

(51) Int. Cl.
*H04B 3/20* (2006.01)

(52) U.S. Cl. ......... 381/66; 381/71.1; 381/71.11; 381/93

(58) Field of Classification Search .................... 381/66, 381/71.11, 71.12, 71.1, 93, 95, 92, 83; 379/406.01–406.16; 455/570, 296, 297; 704/E21.004, E21.002, E21.007, E19.014; 700/94

See application file for complete search history.

(56) References Cited

OTHER PUBLICATIONS

"Robust Speech Dereverberation Using Multichannel Bloand Deconvolution With Spectral Subtraction", Ken'ichi Furuya, member, IEEE, IEEE Transactions on Audio, Speech, and Language Processing vol. 15, No. 5 Jul. 2007, and Akitoshi Kataoka, pp. 1579-1591.

"A complex gradient operator and its application in adaptive array theory", D.H. Brnadwood, B.A., IEEE Proc., vol. 130, Pts. F and H, No. 1, Feb. 1983, pp. 11-16.

*Primary Examiner* — Vivian Chin
*Assistant Examiner* — Leshui Zhang
(74) *Attorney, Agent, or Firm* — Rankin, Hill & Clark LLP

(57) ABSTRACT

Provided is a dereverberation system or the like which copes with an arbitrary condition flexibly and is capable of recognizing a sound or a sound source signal. According to the dereverberation system, an inverse filter (h) is set by using a pseudo-inverse matrix ($R^+$) of a non-square matrix (R) as a correlation matrix of input signals (x). On the basis of the inverse filter (h) and an estimated correlation matrix ($R^{\wedge}$) generated according to a window function (w), an error cost (J(h) between a correlation value of the input signals (x) and output signals (y) and a desired correlation value (d) is calculated. On the basis of the error cost (J(h)), the inverse filter (h) is adaptively updated according to a gradient method.

4 Claims, 8 Drawing Sheets

Original and equalized system responses

Control error spectra

DEREVERBERATION SYSTEM AND DEREVERBERATION METHOD

BACKGROUND OF THE INVENTION

1. Field of the Invention

The present invention relates to a dereverberation system and a dereverberation method.

2. Description of the Related Art

There has been proposed a semi-blind MINT method extended blindly from a MINT method fulfilling a rigorous inverse filter (refer to: K. Furuya and A. Kataoka, "Robust speech dereverberation using multichannel blind deconvolution with spectral subtraction", IEEE Trans. on Speech and Audio Processing, vol. 15, no. 5, pp. 1579-1591, 2007). The validity thereof has been reported as an application in dereverberation for a remote meeting system.

However, the semi-blind MINT method is configured to design the inverse filter after information of a transfer system has been estimated blindly in 2 steps. Accordingly, it is needed to update the information of the transfer system and the inverse filter in a defined constant time frame in order to perform the processing adaptively. Thereby, it is difficult for the semi-blind MINT method to perform the processing adaptively in a high speed. Moreover, since the semi-blind MINT method is principally an extension of the MINT method, it will be restrained from being used in such a condition as, for example, one channel or the like, where the rigorous inverse filter cannot be deduced.

SUMMARY OF THE INVENTION

The present invention has been accomplished in view of the aforementioned problems, and it is therefore an object of the present invention to provide a dereverberation system or the like which copes with an arbitrary condition flexibly and is capable of recognizing a sound or a sound source signal.

To accomplish an object described above, the dereverberation system of the present invention includes a first arithmetic processing element configured to set an inverse filter; and a second arithmetic processing element configured to generate output signals bypassing input signals obtained from an N (N=1, 2 . . . ) number of microphones through the inverse filter set by the first arithmetic processing element; wherein the first arithmetic processing element calculates a pseudo-inverse matrix for a non-square matrix of N×L rows by $N \times N_h$ columns (wherein, $L=N_g+N_h-1$; $N_g$ denotes a response length of a transfer system of source signals from a sound source to the microphones, and $N_h$ denotes a filter length of the inverse filter) as a correlation matrix of the input signals on the basis of the discrete time-series input signals, and sets the inverse filter on the basis of the pseudo-inverse matrix and a desired correlation a value between the input signals and the output signals which satisfy a condition that reverberation components of the input signals are not included in the output signals.

To accomplish an object described above, a dereverberation method of the present invention includes a first step of setting an inverse filter; and a second step of generating output signals by passing input signals obtained from an N (N=1, 2 . . . ) number of microphones through the inverse filter; wherein a pseudo-inverse matrix for a non-square matrix of N×L rows by $N \times N_h$ columns (wherein, $L=N_g+N_h-1$; $N_g$ denotes a response length of a transfer system of source signals from a sound source to the microphones, and $N_h$ denotes a filter length of the inverse filter) is calculated as a correlation matrix of the input signals on the basis of the discrete time-series input signals, and the inverse filter is set on the basis of the pseudo-inverse matrix and a desired correlation value between the input signals and the output signals which satisfy a condition that reverberation components of the input signals are not included in the output signals in the first step.

According to the dereverberation system and the dereverberation method of the present invention, the inverse filter is set by using the pseudo-inverse matrix of a non-square matrix as the correlation matrix of the input signals. According thereto, the microphone numbers, the filter numbers and the filter length $N_h$ can be arbitrarily selected without the need to satisfy conditions for obtaining the rigorous inverse matrix, respectively. Thereby, the inverse filter can be used to generate the output signals in an arbitrary condition where the microphone numbers are restrained, the filter length is restrained in consideration of the signal processing performance of the system, or the like. As a result thereof, the dereverberation system and the method can cope with an arbitrary condition flexibly and will be capable of recognizing a sound or a sound source signal.

It is acceptable that the first arithmetic processing element generates an estimated correlation matrix by estimating the correlation matrix according to a window function, calculates an error cost between a correlation value of the input signals and the output signals and the desired correlation value on the basis of the estimated correlation matrix and the inverse filter, and updates the inverse filter adaptively according to a gradient method on the basis of the error cost.

According to the dereverberation system of the present invention with the above-mentioned configuration, the inverse filter can be appropriately and adaptively set in accordance with environmental variations, such as positional variation of the sound sources, from the viewpoint of approximating the correlation value (accurately, a vector or a matrix expressing the correlation value) between the input signals and the output signals to the desired correlation value.

It is acceptable that the first arithmetic processing element updates the inverse filter on a condition that the inverse filter varies slower than the estimated correlation matrix and non-stationary components in the estimated correlation matrix are less than stationary components thereof.

According to the dereverberation system of the present invention, it is expected to reduce calculation amount and calculation time needed to set the inverse filter by following the approximation method based on the presumption that the mentioned condition is satisfied.

DETAILED DESCRIPTION OF THE PREFERRED EMBODIMENTS

An embodiment of a dereverberation system according to the present invention will be described with reference to the drawings.

Figure 1:
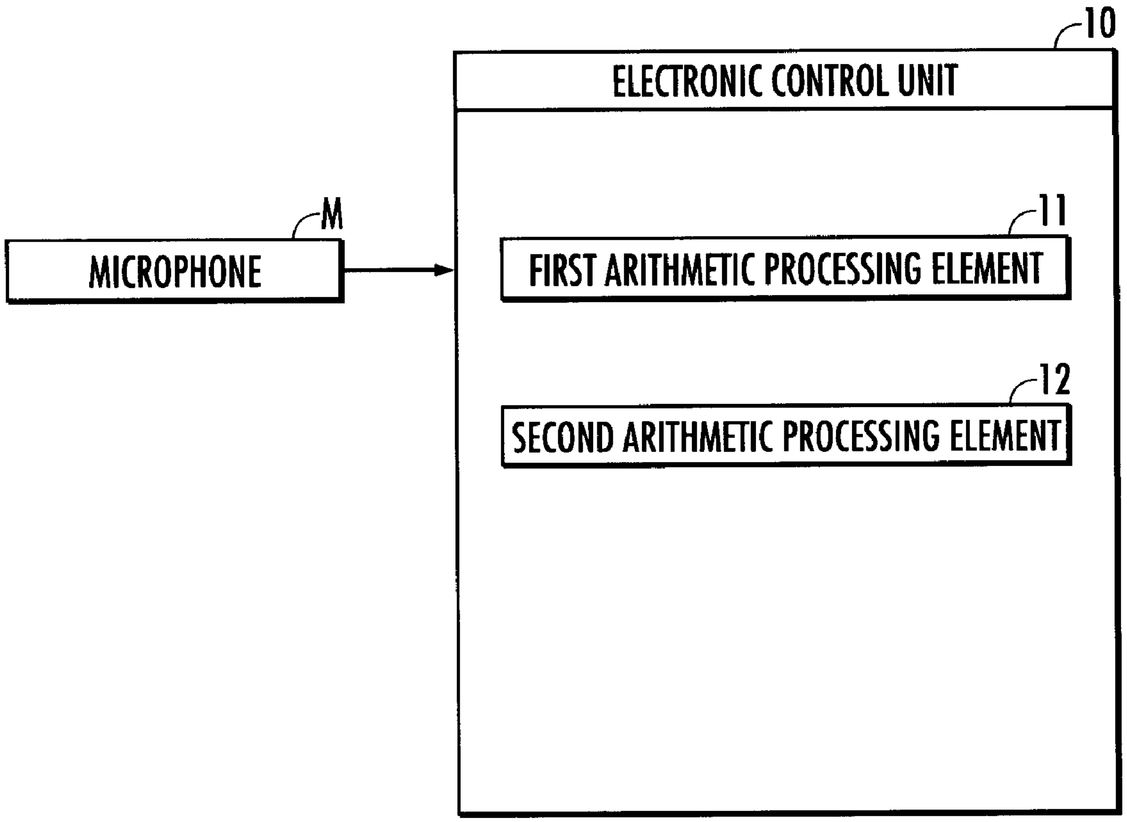
FIG. 1 is a diagram schematically illustrating a dereverberation system according to an embodiment of the present invention.

The dereverberation system illustrated in FIG. 1 is composed of an electronic control unit 10 (including a CPU, a ROM, a RAM, and electronic circuits such as an I/O circuit, an A/D conversion circuit and the like) connected to a microphone M.

Figure 2:
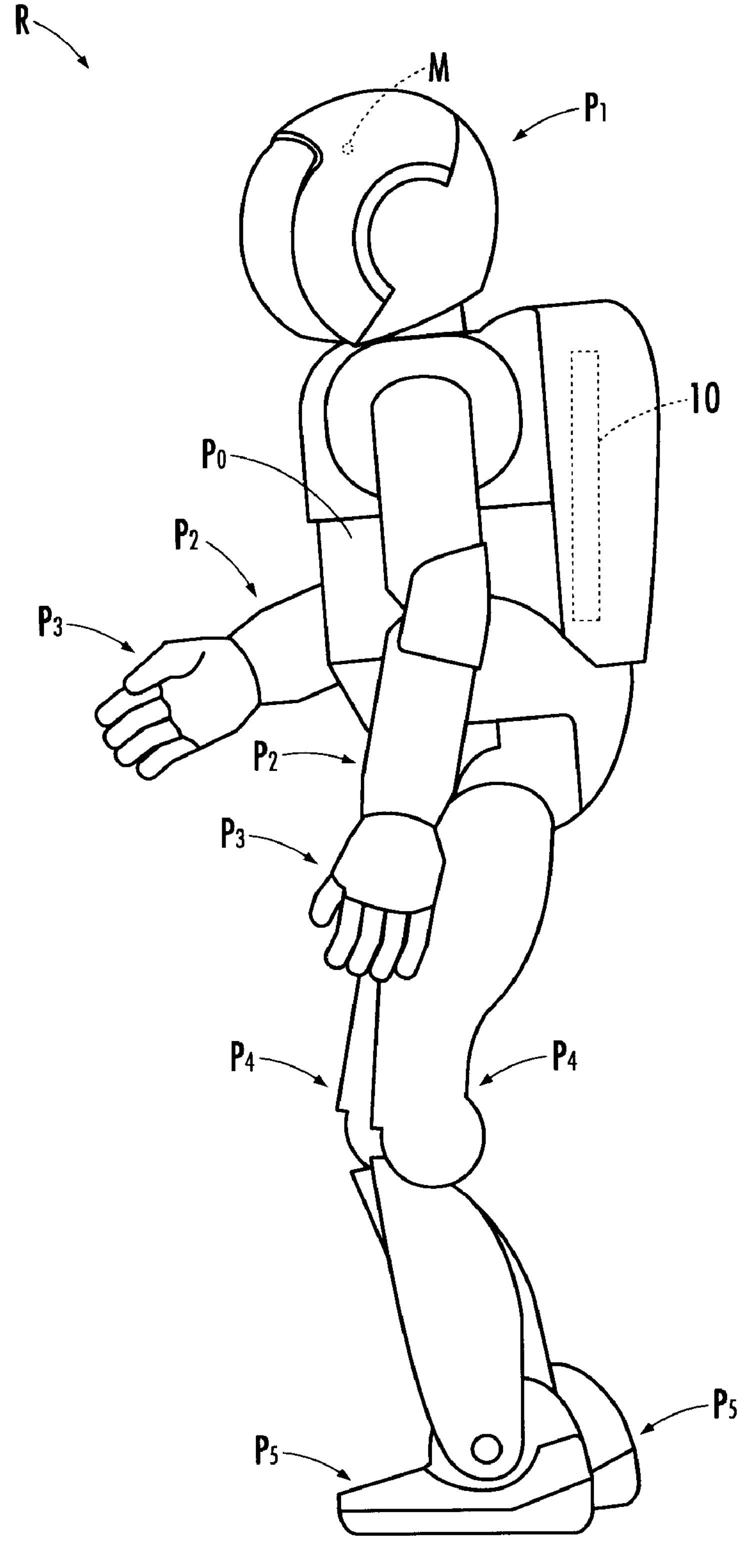
FIG. 2 is a diagram schematically illustrating a robot mounted with the dereverberation system.

The microphone M is disposed in, for example, a head P1 of a robot R, as illustrated in FIG. 2. In addition to the robot R, the dereverberation system can be mounted in any machine or device, such as a vehicle (4-wheel automobile), which is placed in an environment with a sound source. Moreover, the numbers of the microphone M and the arrangement thereof can be arbitrarily altered. It is also acceptable to include the microphone M in the dereverberation system as a constituent element.

The robot R is a bipedal walking robot. Similar to a human being, the robot R is provided with a main body P0, the head P1 disposed above the main body P0, a pair of left and right arms P2 disposed at an upper part of the main body P0 by extending to both sides thereof, a pair of hands P3 connected to an end portion of the pair of left and right arms P2, respectively, a pair of left and right legs P4 disposed by extending downward from a lower portion of the main body P0, and a pair of feet P5 connected to the pair of left and right legs P4, respectively.

The main body P0 is composed of an upper part and a lower part which are connected vertically in a way that both can turn relatively around a yaw axis. The head P1 can move with respect to the main body P0, for example, turning around the yaw axis. The arms P2 have a degree of turning freedom around 1 to 3 axes at a shoulder joint mechanism, an elbow joint mechanism and a wrist joint mechanism, respectively. The hand P3 is provided with a 5-finger mechanism having a thumb, an index finger, a middle finger, a ring finger and a little finger extended from a palm, which are equivalent to those of a hand of a human being. The hand P3 is configured to be capable of holding an object or the like. The legs P4 have a degree of turning freedom around 1 to 3 axes at a hip joint mechanism, a knee joint mechanism and an ankle joint mechanism, respectively. The robot R can perform operations appropriately, such as walking through moving the pair of left and right legs P4 on the basis of a processing result by the dereverberation system.

As illustrated in FIG. 2, the electronic control unit 10 is mounted in the robot R. The electronic control unit 10 includes a first arithmetic processing element 11 and a second arithmetic processing element 12. Each arithmetic processing element is composed of an arithmetic processing circuit, or a memory and an arithmetic processing unit (CPU) which retrieves a program from the memory and performs an arithmetic processing according to the program, for example.

Descriptions will be carried on functions of the dereverberation system with the above-mentioned configuration. First, the dereverberation system 10 obtains an input signal x(t) through the microphone M (FIG. 3/STEP 10).

Figure 3:
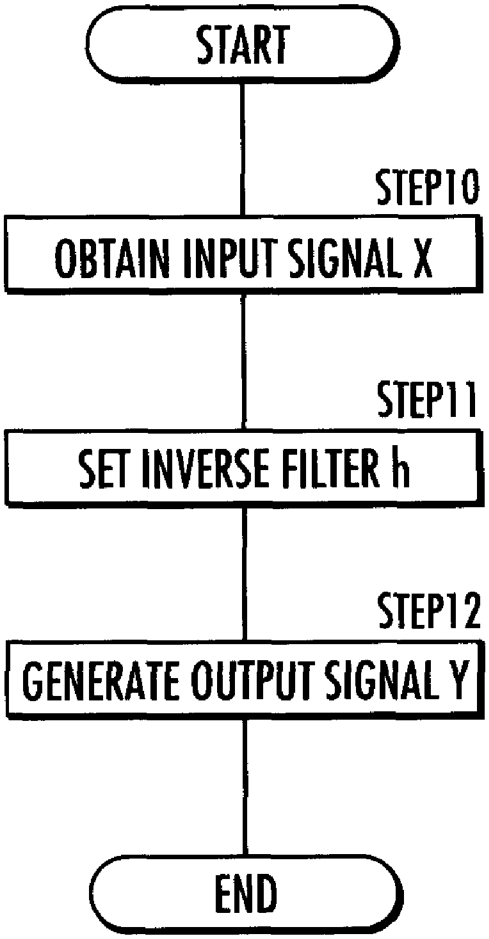
FIG. 3 is a flow chart illustrating a processing order of the dereverberation system.

Thereafter, an inverse filter h is set according to a principle and a procedure to be described hereinafter by the first arithmetic processing element 11 (FIG. 3/STEP 11).

Subsequently, an output signal y(t) is generated by the second arithmetic processing element 12 by passing the input signal x(t) obtained from the microphone M through the inverse filter h set by the first arithmetic processing element 11 (FIG. 3/STEP 12).

(Principle for a Single Input/Output System)

Figure 4:
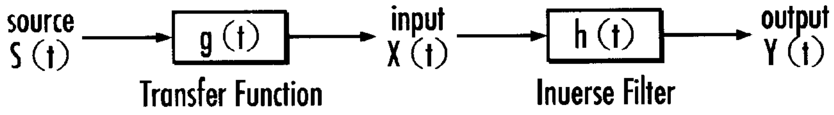
FIG. 4 is an explanatory diagram relating to a single input/output method.

A conception diagram of a single input/output system is illustrated in FIG. 4. The input signal x(t) at a timing t is expressed by the relational expression (011) on the basis of a sound source signal s(t) and an impulse response of a transfer system (referred to as the transfer system hereinafter) g(t).

$$x(t)=s(t)*g(t) \tag{011}$$

Herein, "*" denotes convolution.

The output signal y(t) obtained by pass the input signal x(t) through a filter whose impulse response is h(t) (hereinafter, referred to as filter h(t)) is expressed by the relational expression (012).

$$y(t)=x(t)*h(t) \tag{012}$$

The inverse filter is a filter in which y(t)=s(t), which is defined to satisfy the relational expression (013).

$$g(t)*h(t)=\delta(t) \tag{013}$$

Herein, δ(t) is a δ function which has a value only at t=0.

If the transfer system g(t) is already known, the inverse filter can be obtained from a reciprocal in a frequency area or from the least squares solution of a linear equation. Generally, since the transfer system g(t) is not the least phase signal, therefore, the inverse filter obtained is a approximate one. However, if the transfer system g(t) is unknown, it is impossible to obtain the inverse filter from the relational expression (013).

A cross correlation function $r_{xy}(t)$ between the input signal x(t) and the output signal y(t) is expressed by the relational expression (014) transformed on the basis of the relational expressions (011) and (012).

$$\begin{aligned} r_{xy}(t) &= \sum_{\tau} x(\tau)y(\tau+t) \\ &= \sum_{\tau} x(\tau-t)y(\tau) \\ &= x(-t)*y(t) \\ &= s(-t)*g(-t)*s(t)*g(t)*h(t) \\ &= r_{ss}*g(-t)*g(t)*h(t) \end{aligned} \tag{014}$$

Herein, $r_{ss}$ is a self correlation function (not normalized) of the sound source signal s(t).

For the purpose of simple explanation, the sound source is assumed to be of white color ($r_{ss}$=δ(t)). In this situation, the cross correlation function $r_{xy}(t)$ is expressed by the relational expression (015).

$$r_{xy}(t)=g(-t)*g(t)*h(t) \tag{015}$$

Figure 5:
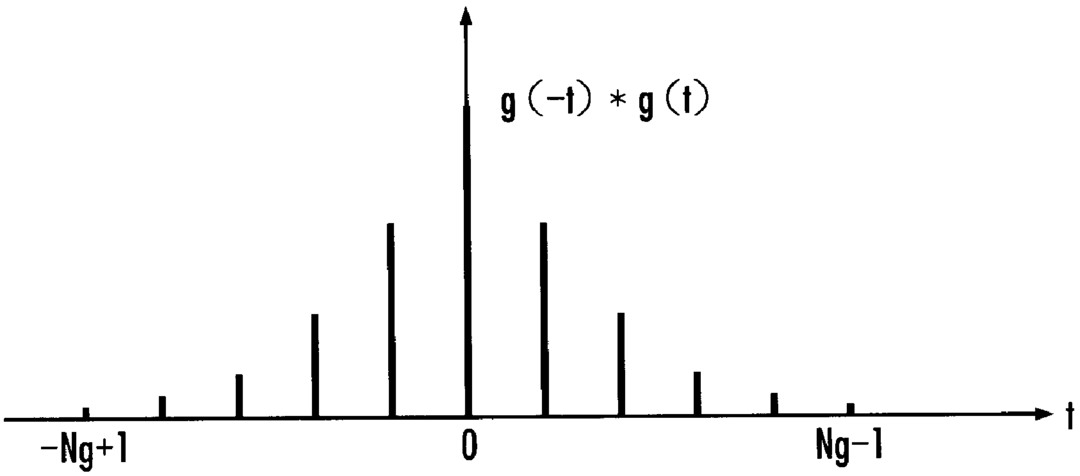
FIG. 5 is an explanatory diagram relating to a cross correlation function.
Figure 5:
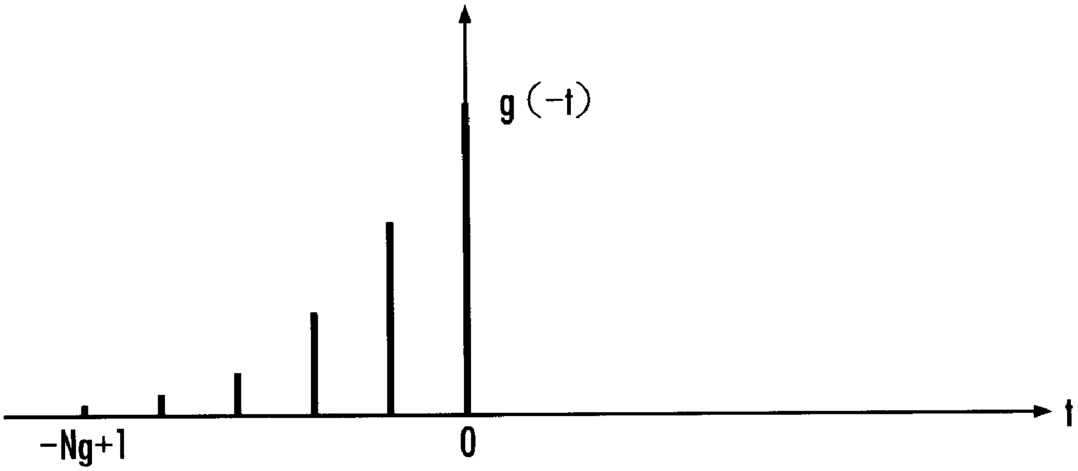

FIG. 5(*a*) illustrates the cross correlation function $r_{xy}(t)$ when there is no inverse filter (h(t)=δ(t)). It is obvious from FIG. 5(*a*) that the cross correlation function $r_{xy}(t)$ in this situation is a function which has a value of $N_g$ at both sides.

On toe other hand, if h(t)≠δ(t) holds, the response length at the right side becomes further longer. However, when the filter h(t) is an inverse filter of the transfer system g(t), the cross correlation function $r_{xy}(t)$ is expressed by the relational expression (016).

$$r_{xy}(t)=g(-t) \tag{016}$$

It is obvious from FIG. 5(*b*) that the transfer system g(t)=0 holds when t<0 since g(t) is a causal signal although it is unknown. On this basis, it is understood that $r_{xy}(t)=0$ holds when t>0 in the relational expression (016) while there is no such relation in the relational expression (015).

When $0<t<N_g+N_h-1$ ($N_g$: the response length of the transfer system g(t), $N_h$: the length of the filter h(t)), generally $r_{xy}(t)\neq 0$ holds. Thereby, to obtain the non-self evident filter h(t) which satisfies the relational expression (017) is equivalent to obtain the inverse filter by excluding the indefiniteness of entire amplitudes.

$$r_{xy}(t)=0\ (0<t<N_g+N_h-1) \tag{017}$$

The reason for that is that the relational expression (017) reveals, that the output signal y(t) is irrelevant to the non-direct sound components of the input signal x(t), in other words, a reverberation component of the input signal x(t) is not included in the output signal y(t).

(Principle for a Multiple Input/Output System)

Figure 6:
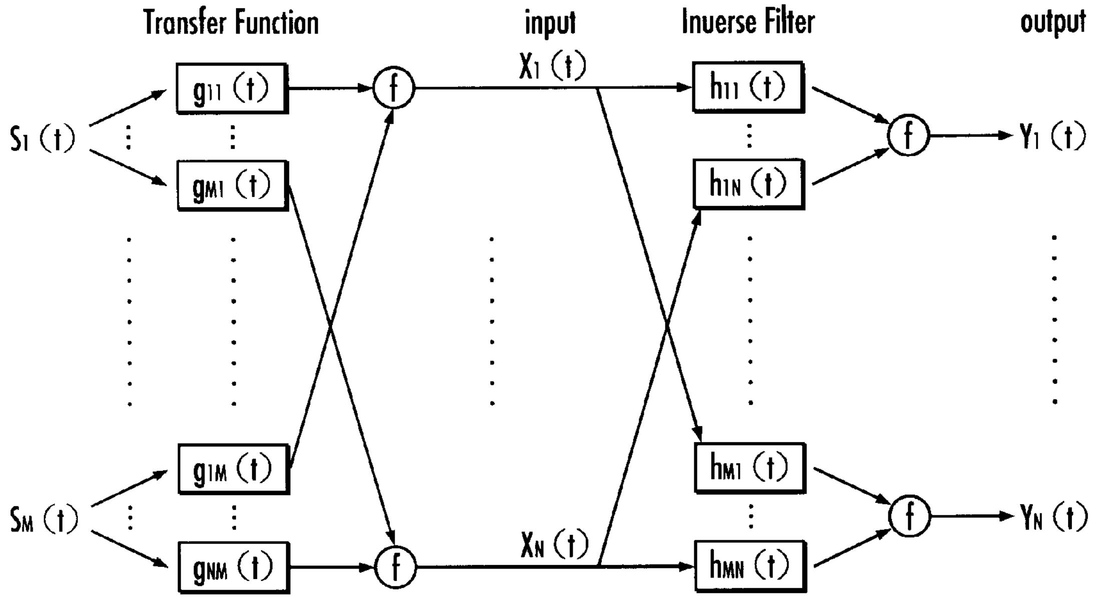
FIG. 6 is an explanatory diagram relating to a multiple input/output system.

A conception diagram of a multiple input/output system is illustrated in FIG. 6. As illustrated in FIG. 6, an input signal $x_n(t)$ input to an $n^{th}$ input channel among N input channels is expressed by a sound source signal $s_m(t)$ of an $m^{th}$ sound source among M sound sources and a system impulse response $g_{nm}(t)$ from the $m^{th}$ sound source to the $n^{th}$ input channel by the relational expression (021).

$$x(t)=G(t)*s(t)$$

$$x(t)=[x_1(t)x_2(t)\ldots x_N(t)]^T$$

$$s(t)=[s_1(t)s_2(t)\ldots s_M(t)]^T$$

$$G(t)=[g_1(t)g_2(t)\ldots g_M(t)]$$

$$g_m(t)=[g_1m(t)g_2m(t)\ldots g_{Nm}(t)]^T \tag{021}$$

Herein, the "*" denotes a calculation by transposing multiplication in a product of matrix and vector into convolution.

Similarly, if an impulse response of a filter connected between an $n(t)^{th}$ input and an $m^{th}$ output is expressed as $h_{mn}(t)$, then, an output signal $y_m(t)$ of the $m^{th}$ sound source is expressed by the relational expression (022).

$$y(t)=H^T(t)*x(t)$$

$$y(t)=[y_1(t)y_2(t)\ldots y_M(t)]^T$$

$$H(t)=[h_1(t)h_2(t)\ldots h_m(t)]$$

$$h_m(t)=[h_1m(t)h_2m(t)\ldots h_{Nm}(t)]^T \tag{022}$$

The cross correlation matrix $R_{xy}(t)$ between the input signal x(t) and the output signal y(t) is expressed by the relational expression (024).

$$\begin{aligned} R_{xy}(t) &= x(-t)*y^T(t) \\ &= G(-t)*s(-t)*s^T(t)*G^T(t)*H(t) \\ &= G(-t)*G^T(t)*H(t) \end{aligned} \tag{024}$$

Herein, the sound source signals from different sound sources are assumed to be irrelevant ($s(-t)*s^T(t)=I\delta(t)$).

When $0<t<L=N_g+N_h-1$, generally $R_{xy}(t)\neq 0$ (zero matrix) holds. Similar to the single input/output system, when a filter H is an inverse filter of Ca transfer system G ($H^T(t)*G(t)=I\delta(t)$), $R_{xy}(t)=G(-t)$ holds. Thereby, to obtain the non-self evident filter H(t) which satisfies the relational expression (027) is equivalent to obtain the inverse filter in the multiple input/output system by excluding the indefiniteness of responsibility of a system, which is corrected by the filter, at T=0.

$$R_{xy}(t)=0\ (0<t<L) \tag{027}$$

The reason for than is that the relational expression (027) reveals that a reverberation component of the input signal x(t) LS not included in the output signal y(t).

First Embodiment

DIF: Decorrelation based Inverse Filter (Single Input/Output System)

h(t) is obtained by excluding delay of the transfer system and assuming g(0)≠0 only. The relational expression (017) and $r_{xy}(0)=g(0)$ are expressed by the relational expression (111) rising an input signal vector (used for calculating the Correlation value) $X_L(t)$, an output y(t), a desired vector d of the correlation value, and an expectation value E[~].

$$E[x_L(t)y(t)]=d$$

$$x_L(t)=[x(t)x(t-1)\ldots x(t-L+1)]^T$$

$$d=[g(0)0\ldots 0]^T \tag{111}$$

Herein, $L=N_g+N_h-1$. "T" denotes transposition.

The output y(t) is expressed by the relational expression (112) using an input signal vector (for the filter) $x_h(t)$ and a filter coefficient vector h.

$$y(t)=x_h^T(t)h$$

$$x_h(t)=[x(t)x(t-1)\ldots x(t-N_h+1)]^T$$

$$h=[h(0)h(1)\ldots h(N_h-1)]^T \tag{112}$$

Therefore, the relational expression (111) can be transformed to the equation (113).

$$Rh=d$$

$$R=E[x_L(t)x_h^T(t)] \tag{113}$$

Herein, R is a non-square correlation matrix of inputs of L rows by $N_h$ columns. Generally, a rigorous solution to the relational expression is not existed. However, it is possible to construct an approximate inverse filter by using the least squares approximate solution h^ of the equation (113).

$$h=R^+d \tag{114}$$

Herein, "$R^+$" denotes a pseudo-inverse matrix of the non-square correlation matrix R. The inverse filter based on the relational expression (114) is called as the decorrelation base inverse filter DIF.

(Multiple Input/Output System)

Similar to the single input/output system, in a multiple input/output system, the decorrelation base inverse filter DIF is also a solution to the equation (123). Note that the correlation matrix of inputs $R_N$ is a non-square correlation matrix of N·L rows by $N\cdot N_h$ columns when the microphones are N (N=1, 2, . . . ).

$$R_N H_h=D$$

$$R_N=E[x_{NL}(t)x_{Nh}^T(t)]$$

$$x_{NL}(t)=[x^T(t)x^T(t-1)\ldots x^T(t-L+1)]^T$$

$$X_{Nh}(t)=[x^T(t)x^T(t-1)\ldots x^T(t-N_h+1)]^T$$

$$H_h=[H^T(0)H^T(1)\ldots H^T(N_h-1)]^T$$

$$D=[G^T(0)0^T\ldots 0^T]^T \quad (123)$$

Therefore, the decorrelation base inverse filter DIF is obtained according to the relational expression (124).

$$H_h=R_h^+D \quad (124)$$

The accuracy of the inverse filter $H_h$ varies in accordance with the numbers of input channels and the filter length. If MINT is equal to or greater than a predefined number or length, the inverse filter can be obtained without error in general. In order to obtain the inverse filter, it is necessary that the transfer system G(0) at the timing t=0 is known; however, if the input channel where the $m^{th}$ sound source signal first arrives (hereinafter, referred to as "initial arrival channel") is known, the coefficient of each column vector $g_m(0)$ of G(0) can be set to zero except that corresponds to the initial arrival channel. If the initial arrival channel is known and differs according to sound sources, the inverse filter can be made by excluding the indefiniteness of amplitudes of each sound source.

If the number of sound source is one and the numbers of the input channels and the filter length are consistent with the MINT conditions, the decorrelation base inverse filter DIF is The consistent with the inverse filter determined by the semi-blind MINT method theoretically.

Second Embodiment

DAIF: Decorrelation based Adaptive Inverse Filtering (Single Input/Output System)

An inverse filtering is performed adaptively by using the correlation values of the input and output signals. In order to obtain adaptively the solution to the relational expression (111), an error cost J(h) expressed by the relational expression (211) is defined.

$$J(h)=\|e\|^2+\sigma\|h\|^2$$

$$e=d-Rh \quad (211)$$

Herein, "σ" is a weight to the norm of the solution. When the weight σ becomes greater, the variation of the transfer function or the robustness to noises is improved; however, the control accuracy degrades. h which makes minimum the error cost J(h) is obtained according to the gradient method by the relational expressions (212) and (213).

$$h=h-\mu J'(h) \quad (212)$$

$$J'(h)=-R^T(d-Rh)+\sigma h \quad (213)$$

Herein, "μ" is a step-size parameter. The step-size parameter μ may be a constant or may be adjusted adaptively. As an adaptive adjusting method for the step-size parameter μ, the Newton method, for example, may be adopted (refer to Japanese Patent Laid-open No. 2008-306712).

A complex gradient method in consideration of extensity thereof is used to deduce h (refer to D. H. Brandwood, "A complex gradient operator and its application in adaptive array theory", IEE Proc., vol. 130, no. 1, pp. 251-276 (1983)).

As the relational expression (213) contains the correlation matrix R, thus, it should be observed in full section. Thereby, an expectation value $$E_w[f(t)]=\sum_{\tau=0}^{\infty} w(\tau)f(t-\tau)$$

estimated from a window function w(t) is used in DAIF. DAIF is expressed by the relational expressions (214) to (216) as an estimated Correlation matrix $\hat{R}=E_w[x_h(t)x_L^T(t)]$ where the window function w(t) is adopted.

$$y(t)=h^T(t)x(t) \quad (214)$$

$$h(t+1)=h(t)-\mu J'(t) \quad (215)$$

$$J'(t)=-\hat{R}^T(t)(d-R(t)h(t))+\sigma h \quad (216)$$

(Multiple Input/Output System)

DAIF in a multiple input/output system can be formulated by the relational expressions (225) and (226) by obtaining $H_h$ for minimizing Frobenius norm $\|E\|^2$ of an error matrix $E=D-R_N H_h$ according to the gradient method.

$$H_h(t+1)=H_h(t)-\mu J'(t) \quad (225)$$

$$J'(t)=-R_N^{\ T}(t)(D-R_N^{\ T}(t)H_h(t))+\sigma H_h(t) \quad (226)$$

Third Embodiment

R-DAIF: Real Time Decorrelation Based Adaptive Inverse Filtering (Single Input/Output System)

R-DAIF is expressed by the relational expression (316) transformed from the relational expression (216) under the assumption that the following two conditions are satisfied.

$$J'(t)=-\hat{R}^T(t)(d-R(t)h(t))+\sigma h \quad (316)$$

(A First Condition)

The filter h(t) varies slower than the estimated correlation matrix $\hat{R}(t)$, and the approximation formula (302) is valid.

$$E_w[x_L(t)x_h(t)]h(t)\approx E_w[x_L(t)y(t)] \quad (301)$$

(A Second Condition)

The non-stationary components of the estimated correlation matrix $\hat{R}(t)$ are less than the stationary components thereof, and the approximation formula (302) is valid.

$$R^T(t)\hat{R}(t)\approx E_w[x_n(t)x_L^T(t)x_L(t)x_n^T(t)] \quad (302)$$

(Multiple Input/Output System)

R-DAIF in a multiple input/output system is calculated according to the relational expression (326).

$$J'(t)=-G(0)E_w[x_{Nh}(t)x^T(t)]+E_w[p_N(t)x_{Nh}(t)y^T(t)+]\sigma H_h(t)$$

$$p_N(t)=\|x_{NL}(t)\|^2 \quad (326)$$

In the multiple input/output system, the convergence thereof is stabilized by making $H_h(t)=G^+(0)$.

According to the dereverberation system 10 of the present invention which exhibits the above-mentioned functions, the inverse filter h is set by using the pseudo-inverse matrix $R^+$ of the non-square matrix R as the correlation matrix of the input C signals x (refer to the relational expressions (114) and (124))

The numbers of the microphones M, the numbers of the filters and the filter length $N_h$ can be selected arbitrarily without the need to satisfy the conditions for obtaining the rigorous inverse matrix, respectively. Thereby, the output signals y can be generated by using the inverse filter h in an arbitrary condition where the numbers of the microphones M are restrained, or the filter numbers or the filter length is restrained in consideration of the signal processing performance of the system (refer to the relational expression (012)). As a result thereof, the dereverberation system can cope with an arbitrary condition flexibly and will be capable of recognizing a sound or a sound source signal s.

Specifically, according to DAIF (the second embodiment), the error cost J(h) of the correlation value between the input signal x and the output signals y with respect to the desired correlation value d is calculated on the basis of the inverse filter h and the estimated correlation matrix R^ generated according to the window function w, and the inverse filter h is adaptively updated according to the gradient method on the basis of the error cost J(h) (refer to the relations expressions (211) to (216), (225) and (226)). As a result thereof, the inverse filter h can be appropriately and adaptively set in accordance with environmental variations, such as positional variation of the sound sources, from the viewpoint of approximating the (correlation value (accurately, a vector or a matrix expressing the correlation value) between the input signals x and the output signals y to the desired correlation value d or D.

Furthermore, according to R-DAIF (the third embodiment) the variation of the inverse filter h is slower than that of the estimated correlation matrix R^, and the inverse filter h is updated in the condition where the non-stationary components of the estimated correlation matrix R is less than the stationary components thereof. As a result thereof, it is expected to reduce calculation amount and calculation time needed to set the inverse filter h by following the approximation method based on the presumption that the mentioned condition is satisfied.

(Experiment)

In order to verify the validity of the present method, an inverse filter of one channel was used to perform the experiment. DIF (the first embodiment), DAIF (the second embodiment), R-DAIF (the third embodiment) and the least squares estimate (LSE) (the Comparative example) were used as the inverse filter, respectively.

As an impulse response of the system, 300 samples excised from the least phase components of the response actually measured in a room were used. As sound source signals, 10000 samples of Gauss noise were used. In each of the first embodiment, the second embodiment and the third embodiment, the impulse response of the system was unknown and was designed by using only the input signals excised at 10000. In the first embodiment (DIF), the inverse filter was obtained from a correlation matrix estimated on the basis of all the input signals. In the second embodiment (DAIF), the inverse filter was adaptively obtained by setting an index window with an attenuation factor of one sample at 0.999 as the window function and setting the step size μ at 0.001. In the third embodiment (R-DAIF), the inverse filter was adaptively obtained by setting the impulse (instant data is used) as the window function and setting the step size μ at 1e-7.

Figure 7:
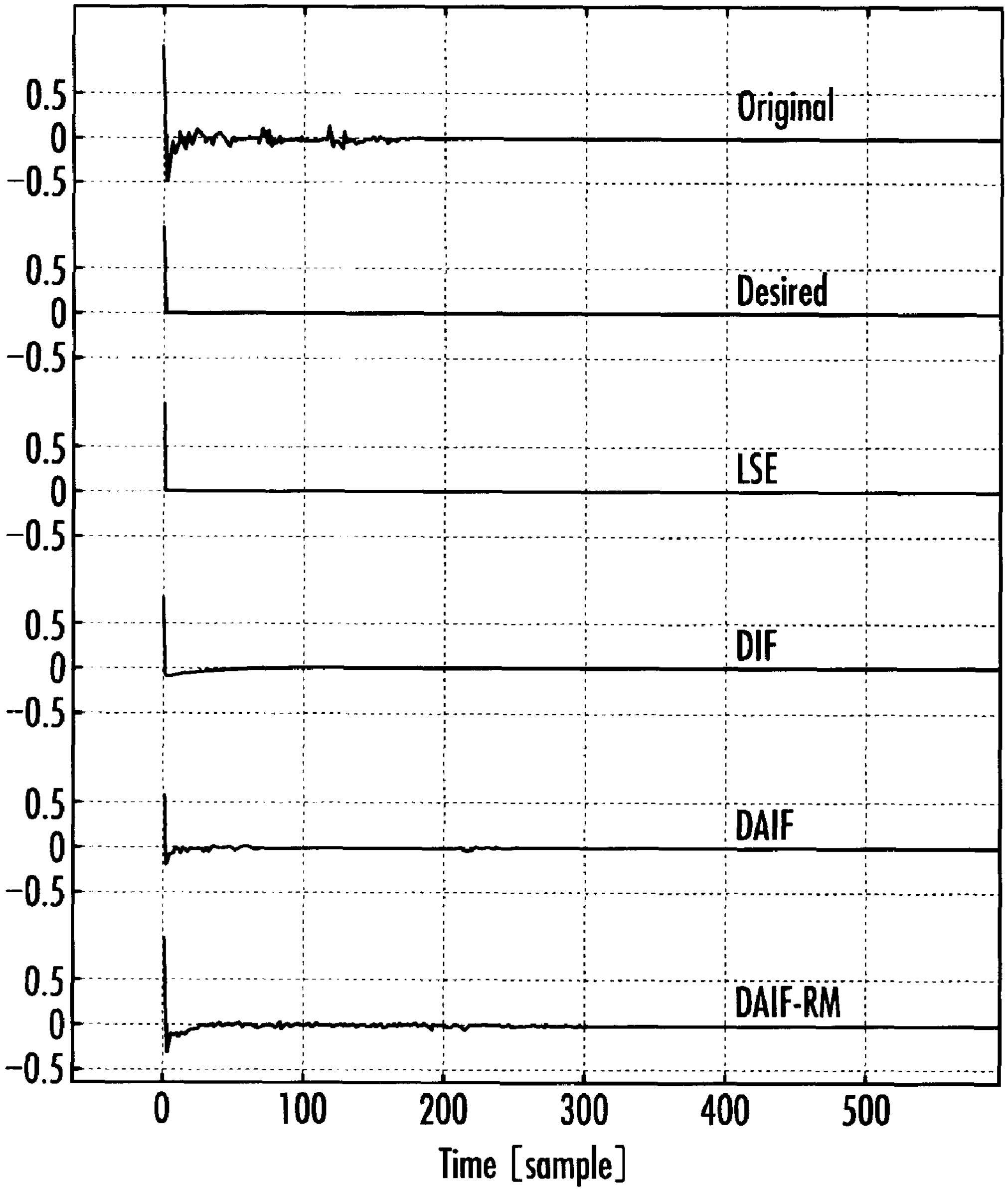
FIG. 7 is an explanatory diagram relating to responses corrected by an inverse filter.

FIG. 7 illustrates the impulse response of the system (Original) the desired impulse response (Desired), the equalized system responses by the inverse filter from each of the first embodiment (DIF), the second embodiment (DAIF), the third embodiment (R-DAIF) and the comparative example (LSE). As obviously seen from FIG. 7, according to the first to third embodiments, the dereverberation accuracy thereof is falling compared with the comparative example in which the system response is known and each is approaching to the desired impulse response further than the original system response.

Figure 8:
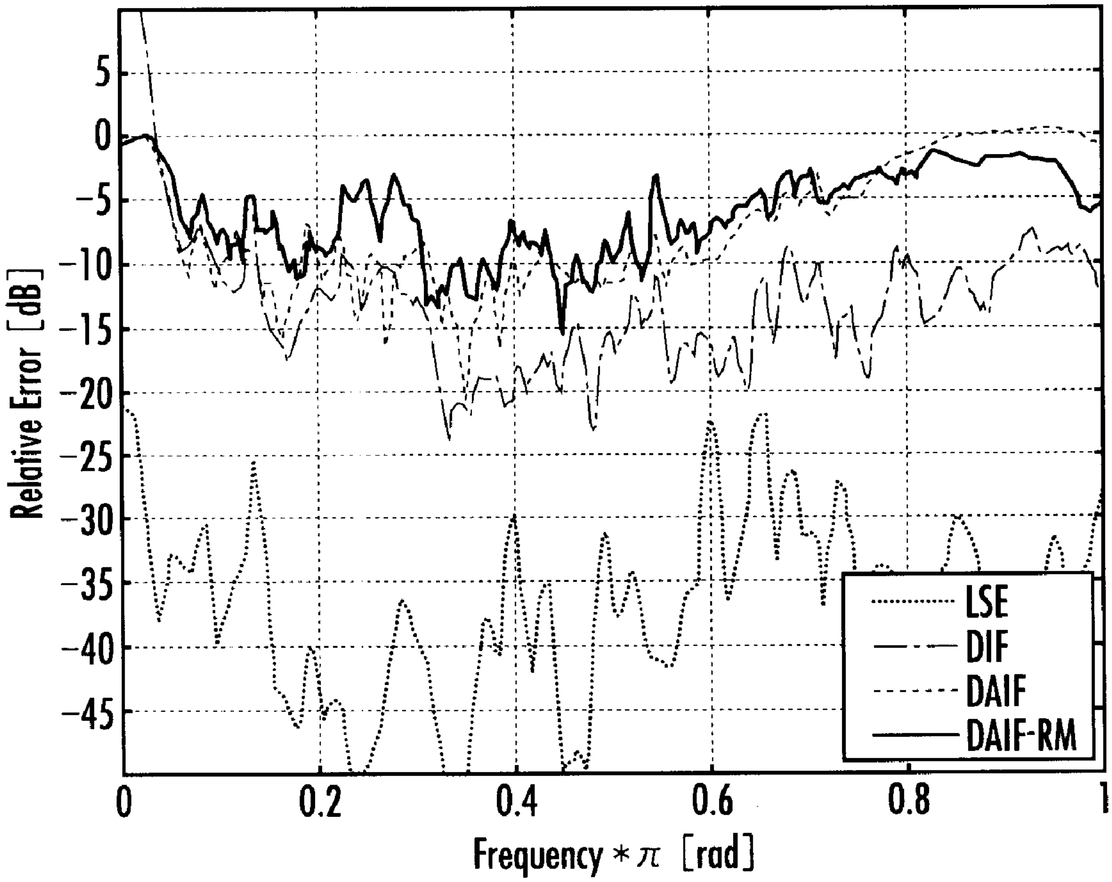
FIG. 8 is an explanatory diagram relating to a relative error of a wave corrected by the inverse filter.

FIG. 8 illustrates a relative error of a wave corrected by the inverse filter in each of the first to third embodiments and the comparative example. The relative error E(X) is calculated according to the relational expression (400).

$$E(\omega)=20\log_{10}\|1-G(\omega)H(\omega)\|/\|1-G(\omega)\| \qquad (400)$$

Herein, G(ω) is a frequency characteristic of the transfer system g(t), and H(ω) is a frequency characteristic of the inverse filter h(t).

As obviously seen from FIG. 8, according to the first embodiment (DIF), the inverse filter is formed with an accuracy between −10 dB and −20 dB; according to the second embodiment (DAIF) and the third embodiment (R-DAIF), respectively, the inverse filter is formed with an accuracy between −5 dB and −10 dB. Since the accuracy difference in the second embodiment (DAIF) and the third embodiment (R-DAIF) is small, it is understandable that it is possible to perform dereverberation at accuracy close to that in a leveled situation even for a correlation matrix with instant data used therein by adjusting appropriately the step size μ.

According to the above-mentioned result, the inverse filter of the present invention is confirmed to be principally valid.

It should be noted that the validity of the inverse filter of the present invention may be confirmed in the multiple input/output system. For example, in an environment with multiple sound sources, sound source separations can be performed simultaneously.

The dereverberation system of the present invention can be used in vocal communications in a remote meeting.

What is claimed is:

1. A dereverberation system which includes an electronic control unit, the electronic control unit comprising:

a first arithmetic processing element configured to set an inverse filter; and a second arithmetic processing element configured to generate output signals by passing input signals obtained from an N (N=1, 2 . . . ) number of microphones through the inverse filter set by the first arithmetic processing element;

the first arithmetic processing element calculates a pseudo-inverse matrix for a non-square matrix of N×L rows by $N\times N_h$ columns wherein, $L=N_g+N_h-1$; $N_g$ denotes a response length of a transfer system of source signals from a sound source to the microphone, and $N_h$ denotes a filter length of the inverse filter, as a correlation matrix of the input signals, and sets the inverse filter on the basis of the pseudo-inverse matrix and a desired correlation value between the input signals and the output signals which satisfy a condition that reverberation components of the input signals are not included in the output signals.

2. The dereverberation system according to claim 1, wherein the first arithmetic processing element generates an estimated correlation matrix by estimating the correlation matrix according to a window function, calculates an error cost between a correlation value of the input signals and the output signals and the desired correlation value on the basis of the estimated correlation matrix and the inverse filter, and updates the inverse filter adaptively according to a gradient method on the basis of the error cost.

3. The dereverberation system according to claim 2, wherein the first arithmetic processing element updates the inverse filter on a condition that the inverse filter varies slower than the estimated correlation matrix and non-stationary components in the estimated correlation matrix are less than stationary components thereof.

4. A dereverberation method, comprising:

a first step of setting an inverse filter; and a second step of generating output signals by passing input signals obtained from an N (N=1, 2 . . . ) number of microphones through the inverse filter;

a pseudo-inverse matrix for a non-square matrix of N×L rows by $N \times N_h$ columns wherein, $L=N_g+N_h-1$; $N_g$ denotes a response length of a transfer system of source signals from a sound source to the microphones, and $N_h$ denotes a filter length of the inverse filter, is calculated as a correlation matrix of the input signals, and the inverse filter is set on the basis of the pseudo-inverse matrix and a desired correlation value between the input signals and the output signals which satisfy a condition that reverberation components of the input signals are not included in the output signals in the first step.

* * * * *